L. H. CONVERSE & J. K. WELTER,

Assignors, by mesne assignments, to FARMERS' FRIEND MANUFACTURING CO.

Seed Dropper.

No. 9,770. Reissued June 21, 1881.

Attest

Jno. Jones

Eugene L. Brukous.

Inventors

L. H. Converse

J. K. Welter by Wood & Boyd their Attorneys.

N. PETERS, Photo-Lithographer, Washington, D. C.

UNITED STATES PATENT OFFICE.

LEWIS H. CONVERSE, OF ST. LOUIS, MISSOURI, AND JAMES K. WELTER, OF HAMILTON, NEW YORK, ASSIGNORS BY MESNE ASSIGNMENTS TO FARMERS FRIEND MANUFACTURING COMPANY, OF DAYTON, OHIO.

SEED-DROPPER.

SPECIFICATION forming part of Reissued Letters Patent No. 9,770, dated June 21, 1881.

Original No. 119,325, dated September 26, 1871. Application for reissue filed April 27, 1881.

*To all whom it may concern:*

Be it known that we, LEWIS H. CONVERSE, of St. Louis, in the county of St. Louis and State of Missouri, and JAMES K. WELTER, of Hamilton, in the county of Madison and State of New York, both formerly of Springfield, in the county of Sangamon and State of Illinois, have invented certain new and useful Improvements in Corn-Planters; and we do hereby declare that the following is a full, clear, and exact description thereof, reference being had to the accompanying drawings, making a part of this specification, in which—

Figure 1:
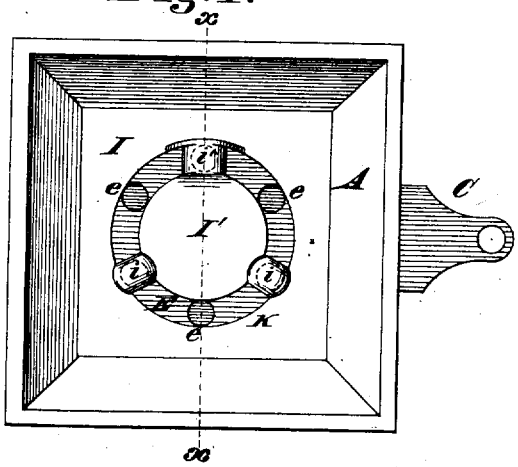
Figure 2:
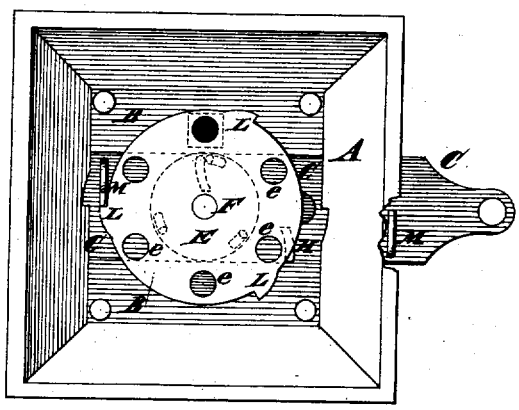
Figure 3:
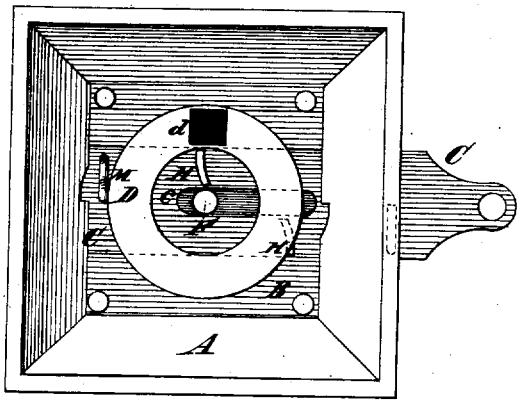
Figure 4:
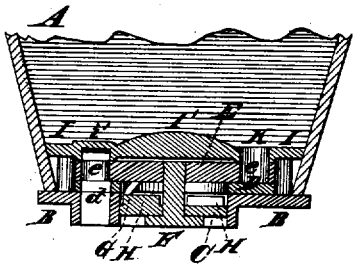
Figure 5:
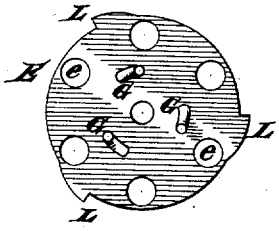

Figure 1 is a plan view of the upper side of a seed box or hopper containing our improved dropping devices. Fig. 2 is a like view of the same, with the covering-plate removed from over the dropper. Fig. 3 is a similar view of said parts, with both covering-plate and dropper removed. Fig. 4 is a vertical central section upon the line *x x* of Fig. 1, and Fig. 5 is a plan view of the lower side of said dropper.

Letters of like name and kind refer to like parts in each of the figures.

Our invention is an improvement in the construction and operation of the dropping device of a corn-planter; and it consists, principally, in the peculiar construction of the dropper, and in the means employed for giving to the same an intermittent rotary motion in one direction, substantially as and for the purpose hereinafter specified.

It consists, further, in the means employed for arresting suddenly the motion of the dropper, substantially as and for the purpose hereinafter set forth.

It consists, also, in means employed for relieving the dropping mechanism from the weight of the load of grain.

In the annexed drawings, A represents a hopper or seed-box of usual construction, having secured to or upon its lower open side a metal plate, B, corresponding in size and general shape therewith, and provided at its transverse center with a right-angled groove, which corresponds in transverse dimensions and shape to and receives a metal slide, C, the ends of which slide project horizontally outward beyond said hopper to a sufficient distance to enable said slide to have the necessary longitudinal reciprocating movement within its groove without withdrawing said ends within said hopper.

Resting upon and secured to the plate B at its radial center is an annular metal ring, D, upon which, in turn, is placed a circular dropping-disk, E, which disk is pivoted upon a stud, F, that is secured to said plate B and extends vertically upward through a suitable slot in the slide C, with its upper end flush with the upper surface of said disk. The opening within the ring D corresponds in diameter to the width of the slide C, and permits the downward passage of three studs, G, which are secured upon the lower side of the disk E at equidistant points, and in a line with the inner edge of said ring and within the circle of the seed-holes of the dropper, as shown in Figs. 2 and 5.

Secured upon the upper face of the slide C, at opposite sides of the slot *c*, and at equidistant points from and upon opposite sides of its center of vibration, are two lugs, H, each of which has a slight curve from the outside of said slide toward the center stud, F, said lugs being so arranged with reference to the studs G as to cause each, when moved by said slide toward the center, to bear against one of said studs and move it forward so as to rotate the disk E one-sixth of an entire revolution, or sufficiently to bring the adjacent stud into engagement with the opposite lug when the latter is moved toward the center by the return motion of said slide. As thus arranged, it will be seen that a reciprocating movement of the slide will be communicated alternately through the curved lugs to the studs attached to the disk, so as to give to the latter an intermittent rotary motion in one direction.

At equidistant points around the outer side of the disk E are provided six circular openings, *e*, having each a suitable size to enable it to contain any desired charge of corn, while through the ring D and plate B is cut a similar opening, *d*, which corresponds in radial position to said openings *e*, so that when said disk is rotated by the motion of the slide its openings will be alternately brought over and caused to coincide with said openings *d*.

Resting upon suitable supports immediately above the dropping-disk is a covering-plate consisting of a central disk, I′, connected by means of spans *i i'* with an outer plate, I, which fills the space horizontally within the hopper, there being left between the two sections of said covering an annular space, K, corresponding in width and radial position to the seed-openings *e* in said dropper-disk, so as to give free access to the same for the grain in the hopper. One of these spans, *i'*, is placed directly over the discharge-passage *d*, so as to prevent seed from dropping directly through the same from the hopper. A metal spring, *k*, secured upon the lower side of the span *i'*, and from thence extending forward, with its end resting upon the surface of the dropper, serves as a scraper, and removes any corn that may project above the openings within the same.

It will now be seen that if corn is supplied to the hopper and a reciprocating motion imparted to the slide, the dropper will be rotated so as to cause each of its openings to fill with corn, and, in turn, pass over the passage *d* and drop its contents into and through the latter. When operated quickly the weight of the dropper is sufficient to cause it to revolve beyond the desired point, to guard against which three lugs, L, are secured to and extend outward from the periphery of the dropper E in such positions as to bring one of the same directly opposite the transverse center of the slide at the precise instant that the corresponding end of the latter has moved inward to its farthest point, in which position said lug strikes against a stop, M, that is secured to and projects upward from the face of said slide, by which means the forward motion of said dropper is instantly arrested, the shock given to the latter being sufficient to effectually loosen any corn that may have become wedged within its cups or openings.

Although the number of openings shown is preferably employed in our machines, we do not confine ourselves to that or any special number, as the principle of operation would be the same whatever the number of openings or proportion of parts.

It will be seen that by the use of this device each of the cups or openings within the dropper has fine opportunities for becoming filled before passing over the passage to the seed-tube, and that consequently little or no possibility exists of a failure of the same to become filled, and, further, that the shock caused by so suddenly checking the motion of said dropper is sufficient to loosen the contents of said cups and cause the same to fall to the ground, however firmly said contents might have become fixed therein.

In addition to the above advantages, the several parts composing the device are so simple as to render no fitting up necessary other than to clean them from the sand of the molds and to drill the screw-holes.

Having thus fully described our invention, what we claim, and desire to secure by Letters Patent, is—

1. In a corn-planter, the rotary dropper-plate provided with a circular series of seed-holes, in combination with a reciprocating slide, said plate and slide being provided with devices coacting within the circle of the seed-holes, for rotating the plate, substantially as and for the purpose specified.

2. In a corn-planter seeding mechanism, the combination of a dropper-plate with a reciprocating slide adapted to actuate said plate by its action upon and in contact with lugs projecting from the under side thereof, as and for the purpose specified.

3. In a corn-planter seeding mechanism, a cover-plate composed of the center disk, I', and outer portion, I, connected so as to leave an intervening annular space adapted to allow the free access of grain to the dropper, substantially as described.

4. In combination with the intermittently-rotating disk of a corn-planter, a covering-plate constructed in two sections, I I', with annular space intervening, as and for the purpose specified.

5. In a rotary corn-planter seeding mechanism, the cover-plate I I', provided with the span *i'*, arranged, as described, directly over the discharge-passage, in combination with a cut-off arranged under said span, for the purpose specified.

6. In combination with the dropper-disk and reciprocating slide, the stationary annular ring D, located between said disk and slide, as and for the purpose specified.

7. The dropper E, pivoted at its center, and provided with the openings *e* and studs G, in combination with the slide C, provided with the lugs H, said parts arranged substantially as described, whereby a longitudinally-reciprocating movement of said slide shall cause said dropper to rotate intermittently in one direction, substantially as and for the purpose specified.

8. In a corn-planter, a reciprocating slide provided with lugs H M to act as drivers and stops to the dropper-plate, substantially as described.

9. The combination of the slide C, provided with lugs M, and the dropper-plate E, provided with lugs L, substantially as and for the purpose set forth.

In testimony whereof we have each hereunto set our hands in the presence of two subscribing witnesses.

LEWIS H. CONVERSE.
J. K. WELTER.

Witnesses to signature of Converse:
WARREN MUNGER,
HARRY H. PRUGH.

Witnesses to signature of Welter:
A. N. SHELDON,
ALBERT SMITH SHELDON.